(12) United States Patent
Staton et al.

(10) Patent No.: US 10,087,632 B1
(45) Date of Patent: Oct. 2, 2018

(54) SHINGLE CLIP SYSTEM AND METHOD

(71) Applicant: Newtonoid Technologies, L.L.C., Liberty, MO (US)

(72) Inventors: Fielding B. Staton, Liberty, MO (US); David Strumpf, Columbia, MO (US)

(73) Assignee: Newtonoid Technologies, L.L.C., Liberty, MO (US)

( * ) Notice: Subject to any disclaimer, the term of this patent is extended or adjusted under 35 U.S.C. 154(b) by 0 days.

(21) Appl. No.: 15/819,800

(22) Filed: Nov. 21, 2017

Related U.S. Application Data

(63) Continuation of application No. 15/711,816, filed on Sep. 21, 2017.

(51) Int. Cl.
| | | |
|---|---|---|
| *E04D 1/34* | (2006.01) | |
| *H02S 20/25* | (2014.01) | |
| *F24S 20/67* | (2018.01) | |
| *F24S 80/00* | (2018.01) | |
| *F24S 25/67* | (2018.01) | |
| *F24J 2/04* | (2006.01) | |
| *F24J 2/46* | (2006.01) | |
| *F24J 2/52* | (2006.01) | |
| *F24J 2/00* | (2014.01) | |
| *F24S 20/00* | (2018.01) | |
| *F24S 25/60* | (2018.01) | |

(52) U.S. Cl.
CPC ............... *E04D 1/34* (2013.01); *F24J 2/045* (2013.01); *F24J 2/46* (2013.01); *F24J 2/5262* (2013.01); *F24S 20/67* (2018.05); *F24S 25/67* (2018.05); *F24S 80/00* (2018.05); *H02S 20/25* (2014.12); *E04D 2001/3408* (2013.01); *E04D 2001/3494* (2013.01); *F24J 2002/0061* (2013.01); *F24J 2002/4665* (2013.01); *F24S 2020/13* (2018.05); *F24S 2025/6004* (2018.05)

(58) Field of Classification Search
CPC .............. E04D 1/34; E04D 2001/3494; E04D 2001/3408; F24J 2/5262; F24J 2/46; F24J 2/045; F24J 2002/061; F24J 2002/4665; H02S 20/25
See application file for complete search history.

(56) References Cited

U.S. PATENT DOCUMENTS

| | | | | |
|---|---|---|---|---|
| 1,753,721 A | * | 4/1930 | Robinson | .................. E04D 1/28 156/150 |
| 1,773,117 A | * | 8/1930 | Rahr | ......................... E04D 1/26 205/122 |

(Continued)

*Primary Examiner* — Jeanette E Chapman
(74) *Attorney, Agent, or Firm* — Lathrop Gage L.L.P.

(57) ABSTRACT

The present disclosure includes roof shingle systems. One roof shingle system includes at least two shingles, a shingle clip, a drip edge, and a power collection unit. Each shingle has a semiconductive layer configured to deliver power, electrical current/voltage, and/or control signals to the power collection unit. The shingle clip continues a conductive path between the two shingles. The drip edge is at least partially insulated and partially conductive, and the conductive portion continues the path from the shingle semiconductive layer to the power unit where energy is collected. One method of installing a shingle system includes the steps of positioning a shingle having a transducer in the form of a semiconductive layer, and positioning a shingle clip to engage the semiconductive layer of the shingle.

17 Claims, 9 Drawing Sheets

(56) References Cited

U.S. PATENT DOCUMENTS

| | | | | |
|---|---|---|---|---|
| 1,789,443 | A * | 1/1931 | Levin | D21J 1/16 204/201 |
| 1,852,169 | A * | 4/1932 | Levy | E04D 1/28 205/158 |
| 2,133,988 | A * | 10/1938 | Harshberger | E04D 1/20 427/186 |
| 2,229,535 | A * | 1/1941 | Weber | E04B 1/6108 52/328 |
| 2,495,303 | A * | 1/1950 | Wisniewski | E04F 13/0864 52/468 |
| 2,547,371 | A * | 4/1951 | Brennan | H01G 9/048 174/126.1 |
| 2,567,554 | A * | 9/1951 | Davey | B43L 7/00 33/492 |
| 2,796,624 | A * | 6/1957 | Speer | E04F 15/02005 16/16 |
| 4,020,611 | A * | 5/1977 | Amos | E04B 1/6112 49/DIG. 1 |
| 4,703,603 | A * | 11/1987 | Hills | F16B 5/0028 52/582.1 |
| 4,913,576 | A * | 4/1990 | Grant, Jr. | A47G 27/045 16/16 |
| 5,415,700 | A * | 5/1995 | Arthur | H01L 31/02246 136/250 |
| 7,444,792 | B2 * | 11/2008 | Matson | E04D 12/00 24/336 |
| D596,482 | S * | 7/2009 | Marinucci | D8/394 |
| 9,112,080 | B1 * | 8/2015 | Corneille | H01L 31/0465 |
| 9,631,377 | B2 * | 4/2017 | Browne | E04F 19/062 |
| 2005/0166956 | A1 * | 8/2005 | Aisenbrey | B29C 45/0013 136/259 |
| 2006/0123730 | A1 * | 6/2006 | Wambaugh | E04F 13/06 52/522 |
| 2006/0157103 | A1 * | 7/2006 | Sheats | H01L 27/3204 136/244 |
| 2008/0196346 | A1 * | 8/2008 | Gibbs | E04D 1/34 52/543 |
| 2008/0202584 | A1 * | 8/2008 | Basol | H01L 31/03928 136/262 |
| 2010/0325976 | A1 * | 12/2010 | Degenfelder | E04D 1/20 52/173.3 |
| 2012/0017972 | A1 * | 1/2012 | Jenkins | E04D 1/26 136/252 |
| 2012/0043310 | A1 * | 2/2012 | Wuchert | H05B 3/34 219/507 |
| 2012/0204927 | A1 * | 8/2012 | Peterson | H01L 31/048 136/244 |
| 2013/0212959 | A1 * | 8/2013 | Lopez | H01L 31/0422 52/173.3 |
| 2014/0098420 | A1 * | 4/2014 | Chung | G02B 27/286 359/489.07 |
| 2015/0288321 | A1 * | 10/2015 | Schick | H01L 31/02008 136/251 |
| 2016/0163913 | A1 * | 6/2016 | Gonzalez | H01L 31/1876 29/846 |

* cited by examiner

200

201 — A typical foundation for a roof is attached to a structure

203 — A drip edge having an insulative component and a insulative component is installed on at least one of the roof sides and the roof bottom 205 — A shingle having a semiconductive transducer pathway is installed on at least one of the undercourse layer and underlayment layer 207 — A shingle clip is installed on the shingle to continue the semiconductive transducer pathway 209 — A second shingle having a semiconductive pathway is installed on at least one of the undercourse layer and underlayment layer. The second shingle engaging the drip edge 211 — At least one electrical lead is connected to the drip edge at one end and to an energy collector at the second end 213 — The semiconductive transducer layer harvests energy that is then stored in the energy collector

FIG. 12

SHINGLE CLIP SYSTEM AND METHOD

CROSS-REFERENCE TO RELATED APPLICATIONS

This application is a continuation of U.S. patent application Ser. No. 15/711,816, filed Sep. 21, 2017, the disclosure of which is incorporated herein by reference in its entirety.

BACKGROUND

Embodiments of this disclosure relate generally to shingle clip systems and methods. More particularly, embodiments relate to conductive shingle clips situated so as to transfer energy converted from a transducer or semiconductor.

Traditional roofing systems typically consist of a plurality of identical roofing shingles arranged in a pattern (i.e. overlapping) across the entire roof of a structure. In this manner, traditional shingles provide for protection from the environment and may have some aesthetic effect.

With the increase of energy prices, and the subsequent increase in energy bills, there exists a market demand for energy consumers to be able to generate their own electricity, thus reducing net energy costs. Therefore, some consumers have turned to solar (also known as "photovoltaic") panels to generate electricity. Such solar systems are often roof-mounted. With this trend, roofing professionals may need additional training and expertise, both in roofing systems and electrical systems, to properly handle and install such systems—or an electrician may be needed. Either way, another layer of cost and inconvenience is added to the system.

Accordingly, there exists a need for an easy-to-install shingle system having a transducer and hardware to transfer that converted energy; for example, a system that is easy to manufacture, install, and works with the pre-existing shingles in the market. Moreover, there exists a need for such a system to emulate traditional shingle systems to allow for ease of installation without specialized knowledge.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In one embodiment, a shingle clip is a cube and includes first and second apertures. The first aperture has a C-shape further defined as a first aperture top surface, a first aperture bottom surface, and a first aperture end surface; the first aperture is located on a first width face of the cube and separates the first width face into first upper and first lower side surfaces. The second aperture has a C-shape further defined as a second aperture top surface, a second aperture bottom surface, and a second aperture end surface; the second aperture is located on a second width face of the cube. The second width face is on an opposed end of the first width face of the cube, and the first and second apertures are sized and shaped such that a shingle side may be positioned within. The distance between the first and second aperture end surfaces is smaller than a height of the cube.

In another embodiment, a shingle system has a shingle clip and a roof shingle. The shingle clip is a cube and has first and second apertures. The first aperture has a C-shape further defined as a first aperture top surface, a first aperture bottom surface, and a first aperture end surface; the first aperture is located on a first width face of the cube and separates the first width face into first upper and first lower side surfaces. The second aperture has a C-shape further defined as a second aperture top surface, a second aperture bottom surface, and a second aperture end surface; the second aperture is located on a second width face of the cube. The second width face is on an opposed end of the first width face of the cube, and the first and second apertures are sized and shaped such that a shingle side may be positioned within. The distance between the first and second aperture end surfaces is smaller than a height of the cube. The roof shingle has a base layer with an elongate rectangular shape in a longitudinal direction for a roof shingle length, an asphalt layer situated upon the base layer, a surface granule layer situated upon a top surface of the asphalt layer, and a semiconductive layer. The semiconductive layer is an elongate strip in the longitudinal direction across the roof shingle length and is situated near a center of the roof shingle. The semiconductive layer is a transducer.

In still another embodiment, a method of installing a shingle system includes the steps of: positioning a drip edge along an incline of a roof, the drip edge having a conductive portion and an insulated portion; positioning a shingle having a transducer in the form of a semiconductive layer engaging at least the conductive portion of the drip edge; and positioning a shingle clip to engage the semiconductive layer of the shingle. The shingle clip is a cube and has first and second apertures. The first aperture has a C-shape further defined as a first aperture top surface, a first aperture bottom surface, and a first aperture end surface; the first aperture is located on a first width face of the cube and separates the first width face into first upper and first lower side surfaces. The second aperture has a C-shape further defined as a second aperture top surface, a second aperture bottom surface, and a second aperture end surface. The second aperture is located on a second width face of the cube, and the second width face is on an opposed end of the first width face of the cube. The first and second apertures are sized and shaped such that a shingle side may be positioned within. The distance between the first and second aperture end surfaces is smaller than a height of the cube.

In yet another embodiment, a method of installing a shingle system includes the steps of positioning a shingle having a transducer in the form of a semiconductive layer; and positioning a shingle clip to engage the semiconductive layer of the shingle.

BRIEF DESCRIPTION OF THE DRAWINGS

FIG. 12 is a flowchart illustrating various steps performed by shingle system installation according to embodiments of the present disclosure.

DETAILED DESCRIPTION

Reference will now be made in detail to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments.

Figure 1:
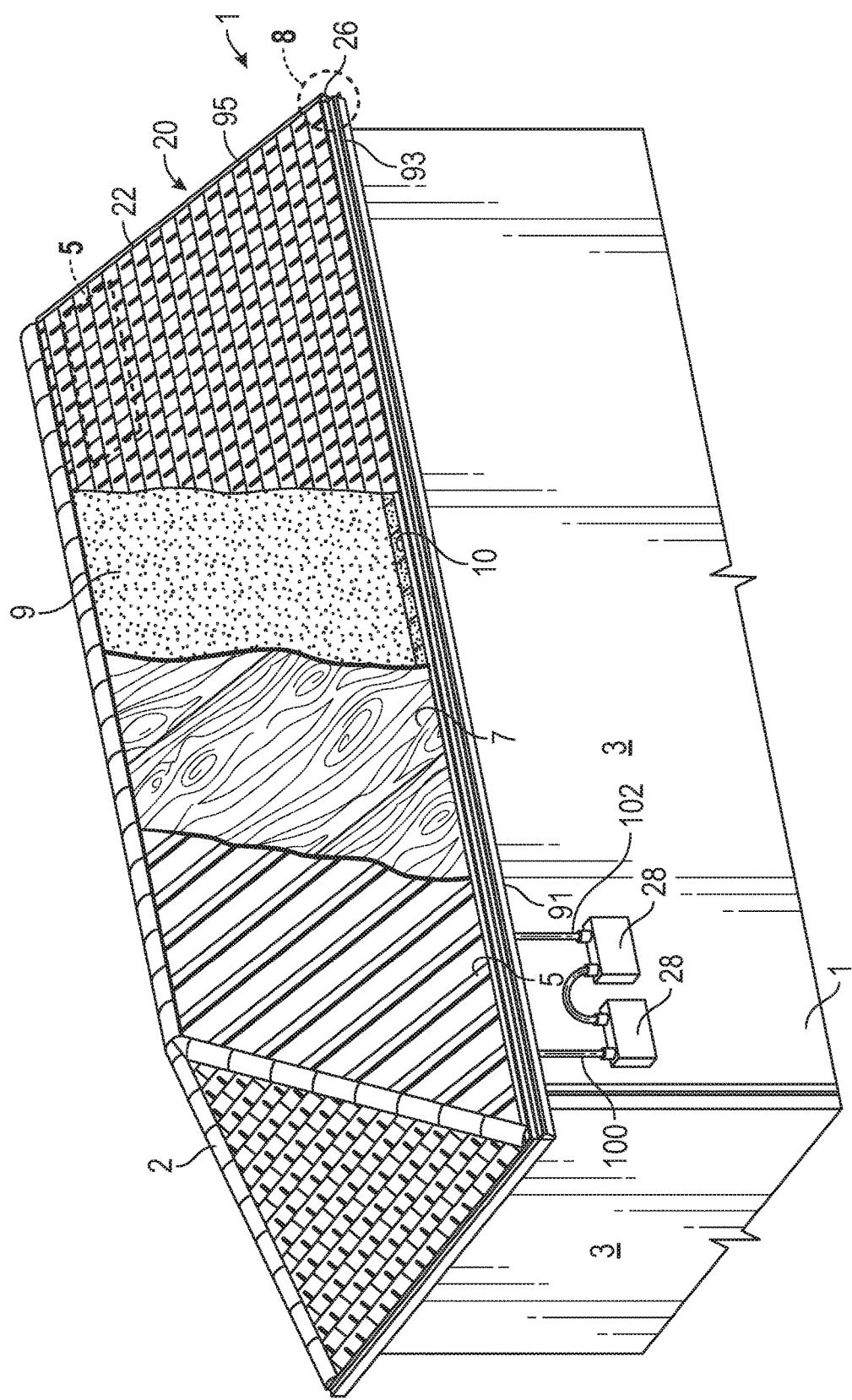
FIG. 1 illustrates an exemplary structure with portions of a roof cut away, the structure having a shingle system according to various aspects to the present disclosure.

FIG. 1 illustrates an exemplary structure 1 according to various aspects of the present disclosure. Structure 1 is preferably a building, such as a residential, commercial, industrial, or mixed-use building, a tool shed, a barn, a kiosk, a gazebo, a billboard, and the like. Structure 1 may also be a mobile structure, such as a mobile home, a recreational vehicle, a food truck, and the like. For purposes of illustration with regard to exemplary FIG. 1, structure 1 will be described as a residential building; that is, a house.

Structure 1 includes a roof 2 and exterior walls 3, wherein roof 2 is supported by wall 3. As illustrated in FIG. 1, roof 2 covers an interior space bounded by walls 3, and may include an overhang (not shown) which covers an exterior space external to the walls 3. Furthermore, it is foreseen that the roof 2 may be a flat surface, a curved surface, or a combination of flat, curved, and angled surfaces.

The roof 2 includes a support structure 5, such as pillars, internal walls, and/or cross beams or trusses. Roof 2 may additionally include an insulating material adjacent the support structure 5 to prevent electrical contact with fasteners 40 and thereby prevent potential eddy currents, hall voltages, and shorting the circuit. Situated over the support structure is a sheathing 7. The sheathing 7 is a thin flat surface which extends across the entire dimension of the roof 2. The sheathing 7 may comprise plywood, strand board, fiberglass, and the like. The sheathing 7 may alternatively be a composite substrate including a material configured to prevent voltage leaks through semi-conductive plywood or strand board substrate layers.

Situated on top of the sheathing layer 7 is an underlayment layer 9. The underlayment layer 9 is a thin surface which extends across the entire dimension of the roof 2 and sheathing layer 7. The underlayment layer 9 may be thinner than the sheathing layer 7 and may comprise felt; tar paper; Spiral cut, Double-laminated and Machine direction drawing (SDM) strength film; or the like.

Situated around the edges 8 of the roof 2 is a starter or undercourse shingle layer 10. This layer 10 may be a single set of asphalt singles laid down in a row or column without overlap, to absorb the flow of water and keep water from deteriorating the edges 8.

Figure 2:
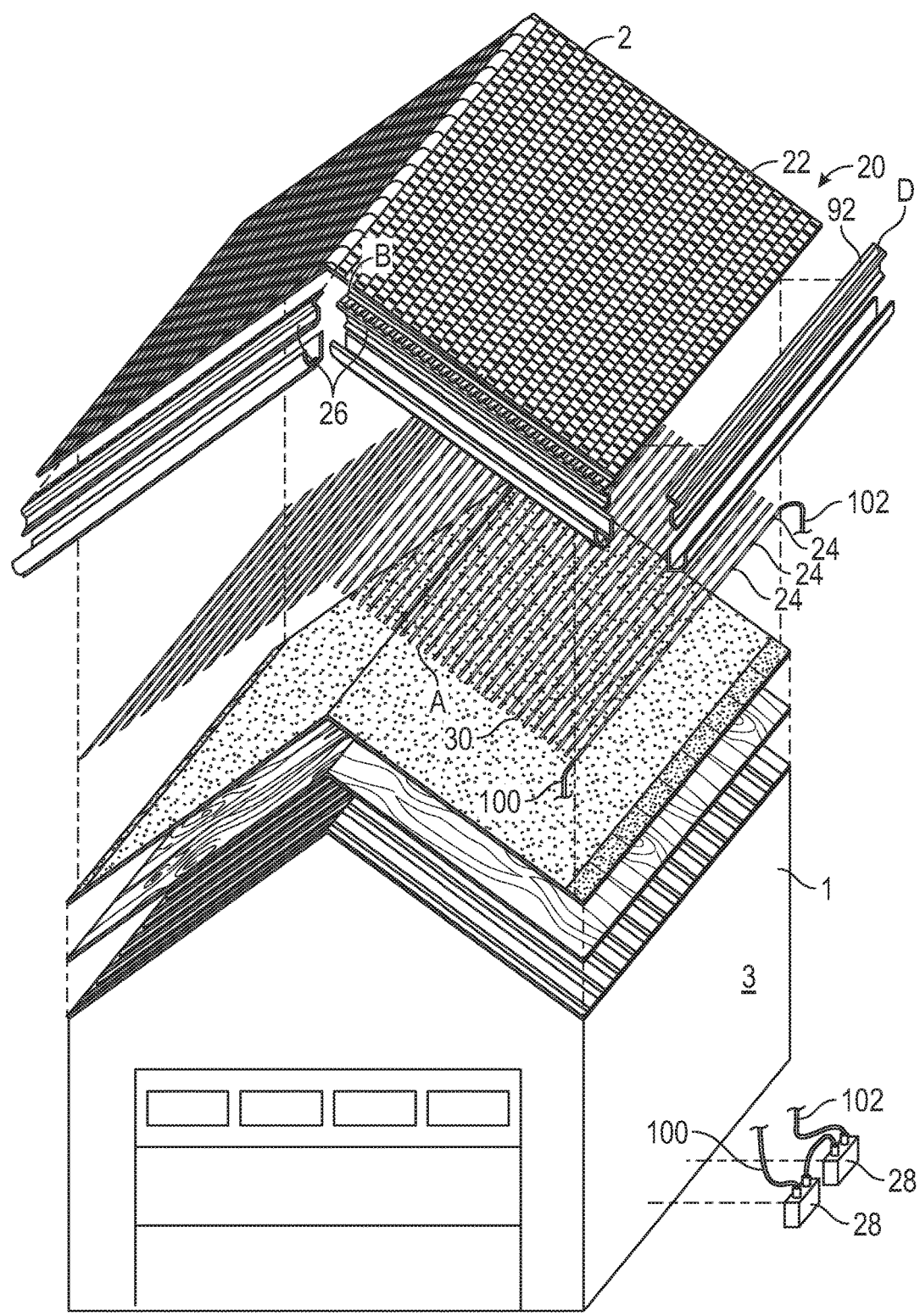
FIG. 2 is an exploded view of the exemplary structure of FIG. 1 and the shingle system with the semiconductive pathways shown in phantom.

Referring to FIG. 2, the roof 2 further includes a shingle system 20. The shingle system 20 has a transducer device that includes a shingle 22, a shingle clip 24, a drip edge 26, and a power unit 28. The shingle(s) 22 are preferably configured to deliver power and/or electrical current/voltage and/or control signals between a semiconductive layer 30 and the power unit 28, such as a battery, a power grid, a computer, and the like as will be further discussed below.

Figure 3A:
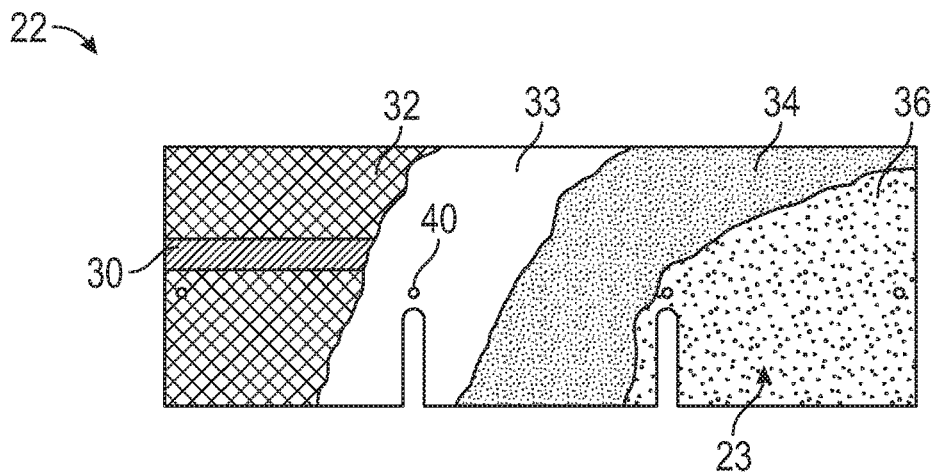
FIG. 3A is a front view of a three tab shingle according to various aspects to the present disclosure with portions cut away.
Figure 3B:
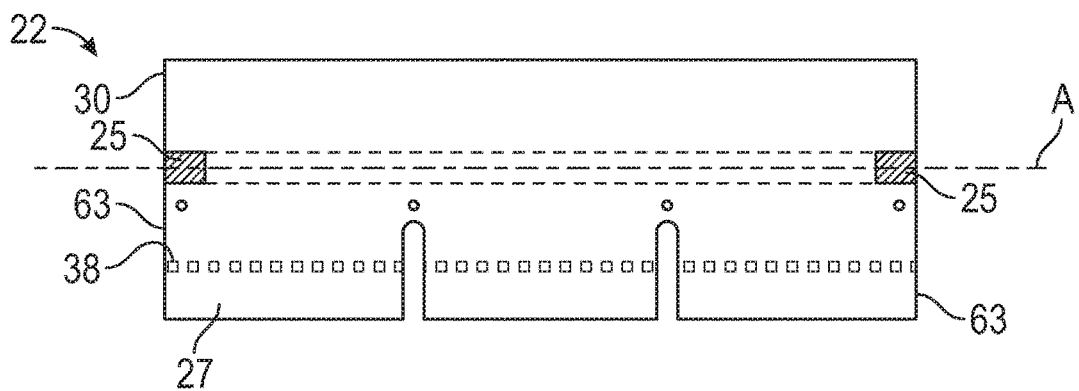
FIG. 3B is a back perspective view of a three tab shingle of FIG. 3A with portions shown in phantom.

Referring to FIGS. 3A-3B, a shingle 22 in an embodiment of the disclosure is shown. The shingles in the illustrated example is a three tab configuration. The shingle 22 includes the following layers: a semiconductive layer 30, a base layer 32, a microweave layer 33, an asphalt layer 34, a surface granule layer 36, and a sealant layer 38. The base layer 32 may be made from organic materials, such as paper (waste or recycled paper), cellulose, wood fiber, or other materials saturated with asphalt to make it waterproof, or the base layer 32 may be made from a fiberglass material. In such a case, the fiberglass material may be made, for example, from wet, random-laid fiberglass bonded with urea-formaldehyde resin.

The semiconductive layer 30 converts one form of energy to an electrical charge or current. The semiconductive layer 30 may (for example) be wafers of semiconductive material aligned in a row, may (for example) be tape or other such adhesive, or may (for example) be in the form of paint and applied to the base layer 32. The semiconductive layer 30 runs lengthwise with the shingle 22 to create a series pathway A (FIG. 2). The semiconductive layer 30 may be on the front side 23, the back side 27, or on both sides 23, 27.

The semiconductive layer 30 may be a thermoelectric generator in some embodiments, wherein heat is transformed to electrical voltage or energy. This is able to convert not the photons of the sun, but of the heat produced by the sun on the roof 2. Such semiconductive material may be bismuth telluride ($Bi_2Te_3$), lead telluride (PbTe), silicon germanium (SiGe), Silicon Phosphorus Boron (SiPB), and the like. These materials must have both high electrical conductivity ($\sigma$) and low thermal conductivity ($\kappa$) to be good thermoelectric materials. The thermal conductivity of semiconductors can be lowered without affecting their high electrical properties using nanoparticles and nanoparticles impurities (doping). This can be achieved by creating nanoscale features such as particles, wires, or interfaces in bulk semiconductor materials.

It is foreseen that an additional convection layer may be provided under the shingle tiles 22 or as an additional layer to the individual shingle 22 itself to aid in the heat transfer of the semiconductive layer 30 or in the heat differentiation in the semiconductive layer 30. The convection layer may be made from material having molecules randomly moving through Brownian motion or diffusion or large scale motion of molecules or advection or some material or materials having a combination of the two modes. The convection layer also adds an insulative layer to the roof and can assist in air control in the dwelling 1.

In other embodiments, the semiconductive layer 30 may be vibrational generators, wherein a semiconducting crystal is put under strain by kinetic energy, i.e. sound or force, and the vibration creates a small amount of current due to the piezoelectric effect. Such a layer 30 may be more advantageous to populations where the weather is more tropical, though it may also work sufficiently in other environments. The layer 30 may utilize the vibrations from rain drops, hail, snow, sleet, pressure involved from high winds, and the sound of thunder to create energy. It is foreseen that the semiconductive layer 30 may be several strips of different material, wherein each performs a specific task, i.e. one material converts heat to energy, another sound to energy, and so forth. It is also foreseen that the same semiconductive material may perform all the functions of the transducers mentioned and those later developed.

In some embodiments of a vibrational generator, the semiconductor layer 30 may be an adhesive comprising a plurality of three-dimensional (3D) nanostructures. The 3D nanostructure may, for example, include a core and a plurality of spokes extending radially outwardly from the core. The spokes may extend outwardly at a variety of angles. The nanostructure may be formed of one or more materials which give the nanostructure semiconductive characteristics that create charge and/or voltage. During a thunderstorm, the roof 2 may experience hail, which exerts an applied energy on the shingles which, due to the enhanced adhesive having the piezoelectric effect, when the shingles receive an applied energy from the hail, energy is at least partially transferred to the 3D nanostructures such that the nanostructures flex or compress. Here, because the energy may be greater, the nanostructures may experience a greater amount of compression. The nanostructures then return to their natural state due to the elasticity of the nano structures, which returns as an applied energy to the semiconductor layer 30.

The semiconductive layer 30 may be applied or constructed such that a diode is created, directing the current produced to flow in one direction. The diodes could change the direction of the current, therein creating an alternating current situation, which would allow the current to travel further across larger roofs 2.

The semiconductive layer 30 may be constructed as a data collection flow, in which data such as shingle humidity, total energy harvest of all shingle, individual shingle harvest, type of energy converted (i.e. rain vibration versus heat), which side of the roof harvests more energy, individual shingle temperature, etc. can be collected and saved at the energy collector. Such data can then be converted into reports that can be viewed on a display, such as a computer, cellular phone, tablet, and the like. Such reporting can be used to determine the life of individual shingles 22, i.e. if there is rot or water retention in the shingles 22.

The base layer 32 and semiconductive layer 30 are then coated with asphalt or other cement/stone mixture creating the asphalt layer 34 on all sides. The asphalt layer 34 contains mineral fillers that make the shingle 22 waterproof and resist fire better. An additional layer 33, such as a microweave layer or additive known as styrene-butadiene-styrene (SBS), sometimes called modified or rubberized asphalt, is sometimes added to the asphalt mixture to make shingles more resistant to thermal or physical cracking, as well as more resistant to damage from hail impacts, and may also be present. It is foreseen that the semiconductor layer 30 may have a protective layer applied atop, such that when the asphalt layer is applied, it does not affect the mechanics of the semiconductive layer 30.

The surface granule layer 36 covers the asphalt layer 34 on the front surface 23 of the shingle 22. The surface granule layer 36 may be slate, schist, quartz, vitrified brick, stone, ceramic granules, and the like. The back side may also be treated with sand, talc, or mica, for example, to prevent the shingles 22 from sticking to each other before use. Some manufacturers use a fabric backing known as a "scrim" on the back side of shingles 22 to make them more impact resistant, and this may be used in embodiments of the current invention as well.

The sealant layer 38 is applied to the front surface 23 and sometimes to the back surface. The sealant layer 38 may be an adhesive that seals the shingles 22 to one another such that the shingles better resist being blown off by wind or other means. It is foreseen that the semiconductive layer 30 and the sealant layer 38 may be a unitary layer or applied one atop the other to create a conductive path A (FIG. 2).

With reference to FIG. 3B, the back side 27 of the shingle 22 is illustrated, and situated on both sides 63 of the shingle 22 are apertures or spots 25 where layers 33, 34, and 36 were not laid on; this is such that the conductive pathway A may continue. The spots 25 are sized and shaped such that the clip 24 will cover all or substantially all of the aperture 25 once the clip 24 is in position. The aperture 25 also acts as a placeholder to aid in situating the clip 24. It is also noted that the aperture 25 mates with the drip edge 26 to continue the electrical conductive pathway A as will be further explained below.

Figure 4A:
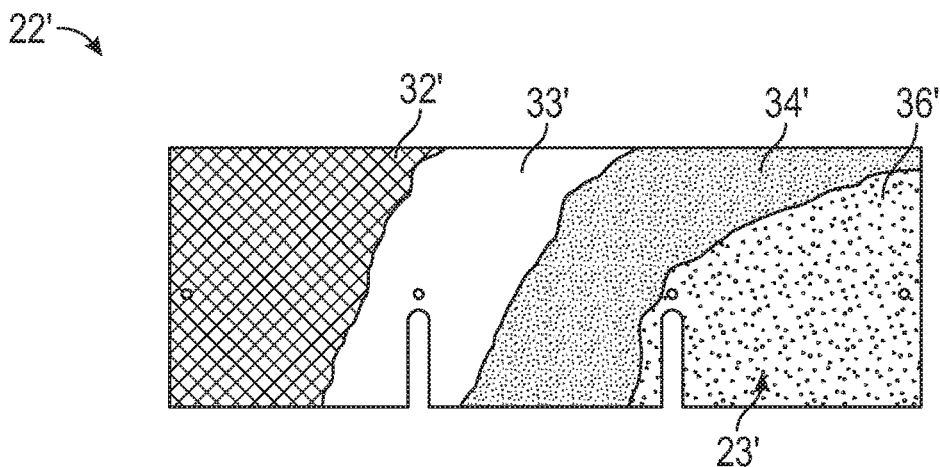
FIG. 4A is a front view of a three tab shingle with portions cut away according to a second embodiment.
Figure 4B:
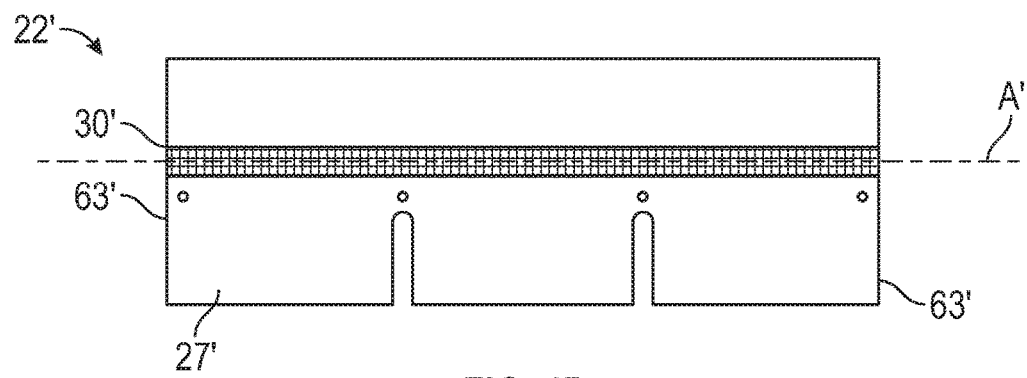
FIG. 4B is a back perspective view of a three tab shingle of FIG. 4A.

Referring to FIGS. 4A-4B, a shingle 22' of another embodiment of the disclosure is shown. The shingle 22' has a front surface 23' that is similar to a standard shingle known in the art. For example, the shingle 22' may not have an internal semiconductive layer 30 as the shingle 22 does, but instead of or in combination with the semiconductive layer 30 has a semiconductive layer 30' applied on the back external surface 27' of the shingle 22'. The semiconductive layer 30' may be tape, adhesive, or in the form of paint and applied to the backside 27' before installation. In some embodiments, the semiconductive layer 30' is applied at the installation site rather than being manufactured with the shingle 22'; in other embodiments, the semiconductive layer 30' is applied before reaching the installation site. The location of the semiconductive layer 30' on the exterior of the shingle 22' may aid in transfer from layer 30' to clip 24'.

Figure 5:
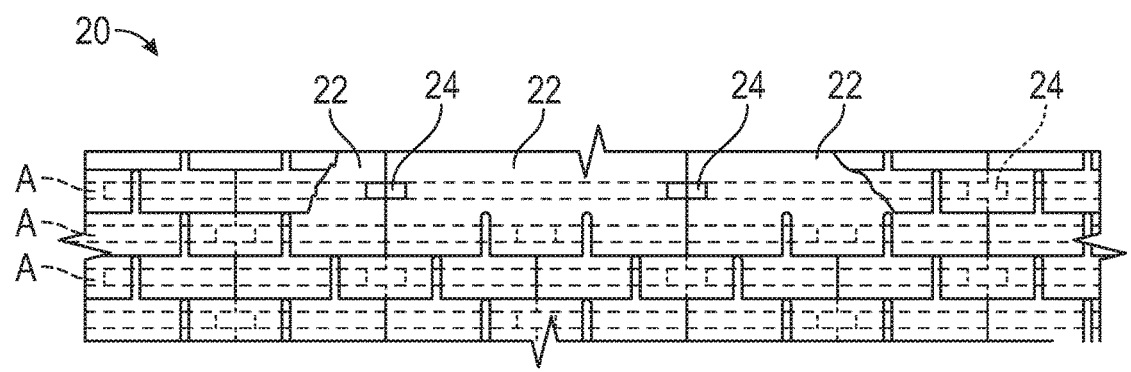
FIG. 5 is a front view of a section of the shingle system of FIG. 1 with portions shown in phantom.

Referring to FIG. 5, the shingle system 20 includes individual shingles 22 including ridge shingles 23 at the top of the structure 1 and shingle clips 24 that are attached to the individual shingles 22, such that a continuous conductive flow is not interrupted from one shingle 22 to the next. The shingle clips 24 have a low profile so as not affect the sealant layer 38 from sealing the shingles 22 one atop the other, so as to avoid blow off.

Figure 6:
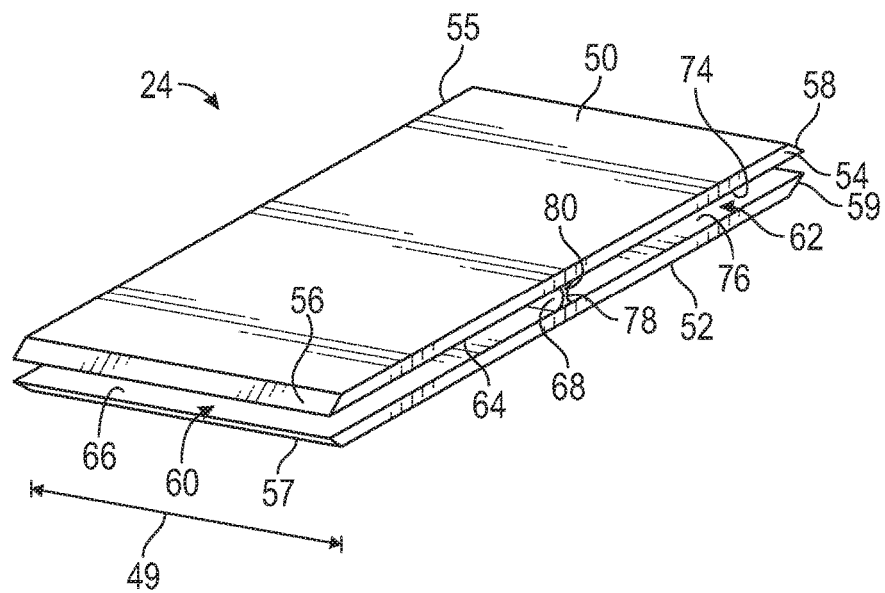
FIG. 6 is a perspective view of a shingle clip according to one embodiment of the present disclosure.
Figure 7:
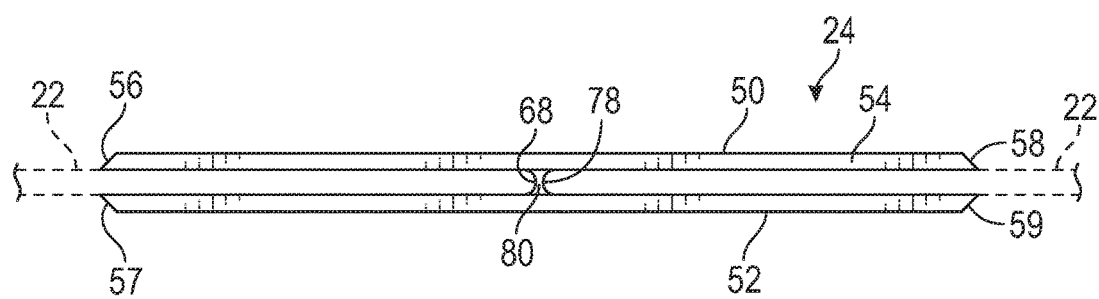
FIG. 7 is a side view of the shingle clip of FIG. 6 illustrated in-between two shingles shown in phantom.

Referring to FIGS. 6-7, the shingle clip 24 may be shaped as an elongated "double-C" clip or clasp. The clips 24 are positioned in the semiconductive pathway A in-between two adjacent shingles 22 (FIG. 7). A width 49 of the shingle clip 24 is substantially similar to the thickness of the semiconductive layer 30 (FIG. 4). The clip 24 has a top surface 50, a bottom surface 52, side surfaces 54, 55, and may further includes edge surfaces 56, 57, 58, 59. Adjacent the top surface 50 are the edge surfaces 56, 58, and adjacent the bottom surface 52 is the edge surfaces 57, 59. The edge surfaces 56, 57, 58, 59 may be sloped downward toward the shingle 22, so as to allow for a sliding surface when the next shingle 22 is installed atop the shingle clip 24.

Situated between edge surfaces 56, 57 is a first shingle aperture 60 and likewise, situated between edge surfaces 58, 59 is a second shingle aperture 62. The first and second apertures 60, 62 are sized and shaped such that a thickness of the shingles 22 may be situated within the apertures 60, 62 (FIG. 7). The first aperture 60 is defined by an upper surface 64, a lower surface 66, and an end surface 68. Likewise, the second aperture 62 is defined by a second aperture upper surface 74, lower surface 76, and end surface 78. The end surfaces 68, 78 create an abutting surface for an end 63 of a shingle 22. A portion 80 of the side surface 54 separates the first and second apertures 60, 62. The thickness of portion 80 is small (i.e. 1-2 mm thick), so as not to create a large separation between shingles 22 and thus defeat the purpose of the shingles 22. The thickness of the portion 80 is typically smaller than the height of the clip 24.

Figure 8:
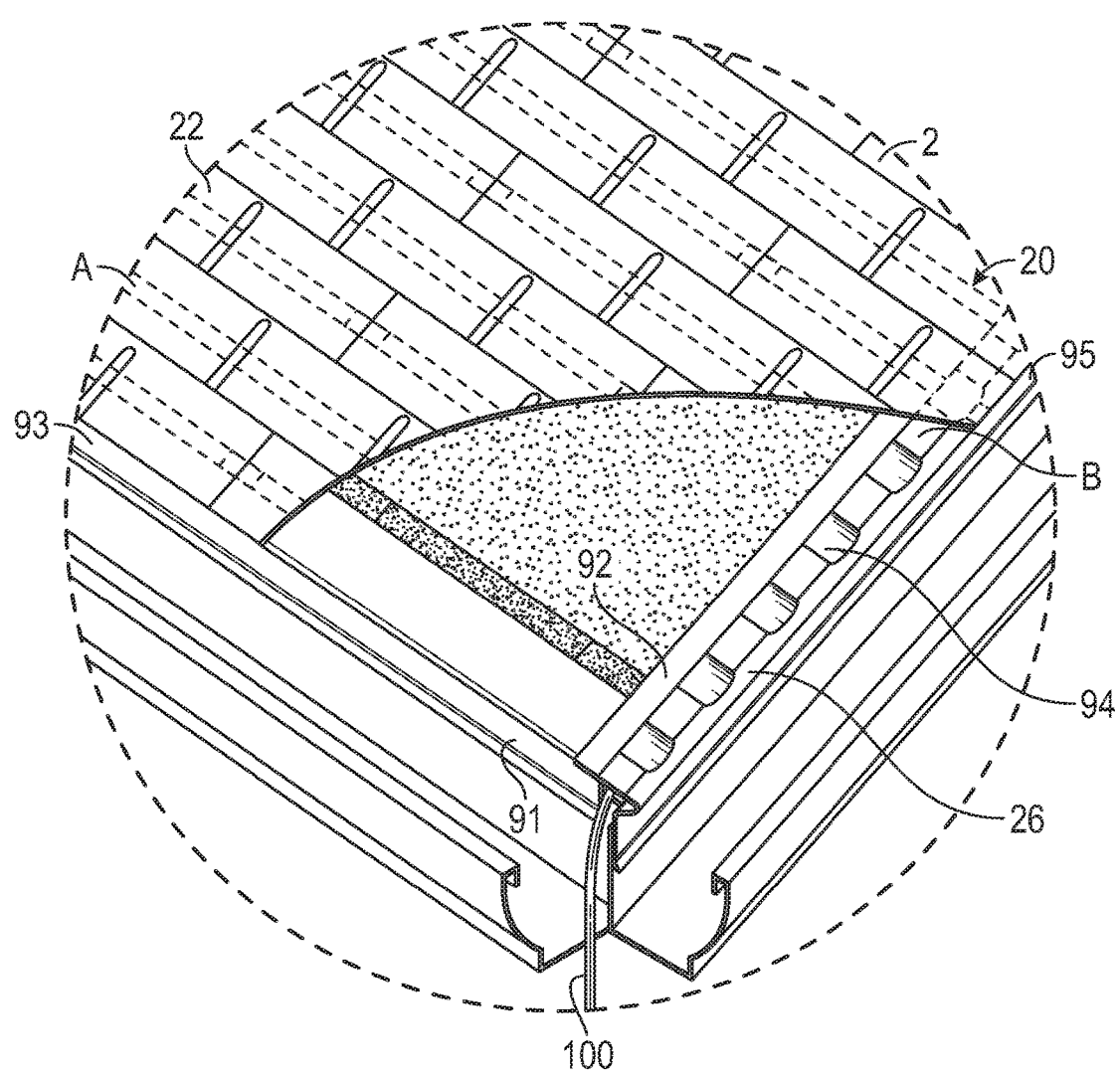
FIG. 8 is a magnified corner portion of FIG. 1 with portions of the shingle system cut away and a drip edge according to various aspects of the present disclosure.

Referring now to FIG. 8, a drip edge 26 is shown in abutment with each conductive pathway A creating a parallel resistance path. The drip edge 26 has further features than a standard drip edge 91 illustrated along a bottom 93 of the roof 2. In some embodiments, the drip edge 91 may be insulated completely to minimize energy leakage, for example a drip edge made from a plastic material or a metal drip edge that has been coated with an insulation layer.

In the illustrated embodiment, the drip edge 26 has a "D" style edge, but other edges may also be used, such as hemmed roof, "T" style, 3-way, and the like. The drip edge 26 has a top surface 92, and located on the top surface 92 are ridges or bumps 94. These bumps 94 are positioned such that they will interact and at least engage the aperture 25 to continue the electrical flow.

Figure 9:
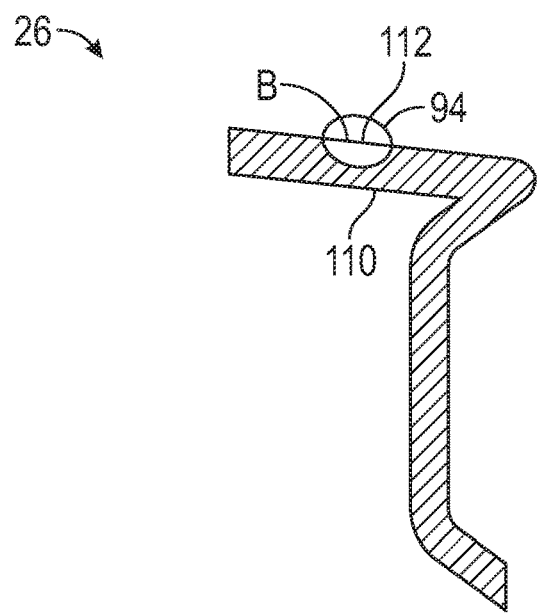
FIG. 9 is a cross-section view of a drip edge according to various embodiments of the present disclosure.
Figure 10:
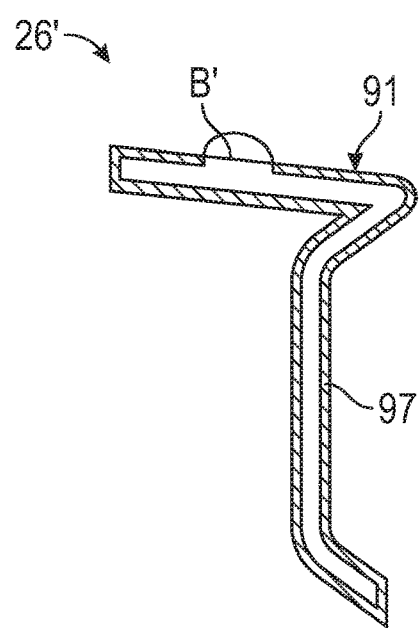
FIG. 10 is a cross-section view of a drip edge according to other embodiments of the present disclosure.

With reference to FIG. 9, a drip edge 26 is shown as created by manufacturing the drip edge 26 from two materials, one insulative 110 (i.e. plastic) and the other conductive 112, such that a second conductive pathway B is created that mates up with the first conductive pathway A (FIG. 8). With reference to FIG. 10, a drip edge 26' may be created with standard sheet metal drip edge 91 and coated with an insulative layer 97 so as to create the second conductive pathway B' (FIG. 10). These examples are not meant to be limiting, as there may be cause to create a non-uniform conductive pathway B; as an example, the shape of the roof 2 may dictate such. In such a case, there may be breaks (not shown) in the conductive pathway B, therein forcing the energy to travel back lengthwise of the roof 2 rather than up and down the sloped sides 95 (e.g., C-shaped, S-shaped).

The conductive drip edge 26 may be along both sides 95 of the roof 2, along one side 95 of the roof 2, or along both sides 95 and the bottom of the roof 93. In a first configuration (or "parallel configuration"), two drip edges 26 are positioned with one on each side 95, creating second and third conductive pathways B. Here, the energy flows equally in both directions. This configuration allows for energy collection to occur on both sides of the house 1 as will be further discussed below.

In a second configuration (or "series configuration"), a single drip edge 26 is positioned on one side 95 (FIG. 8). The other side has an insulated drip edge 91, therein grounding that side 95. The clips 24 are converted to diodes to direct the current produced in the opposed direction towards the conductive pathway B in the drip edge 26 and then further to energy collection or battery 28.

Figure 11:
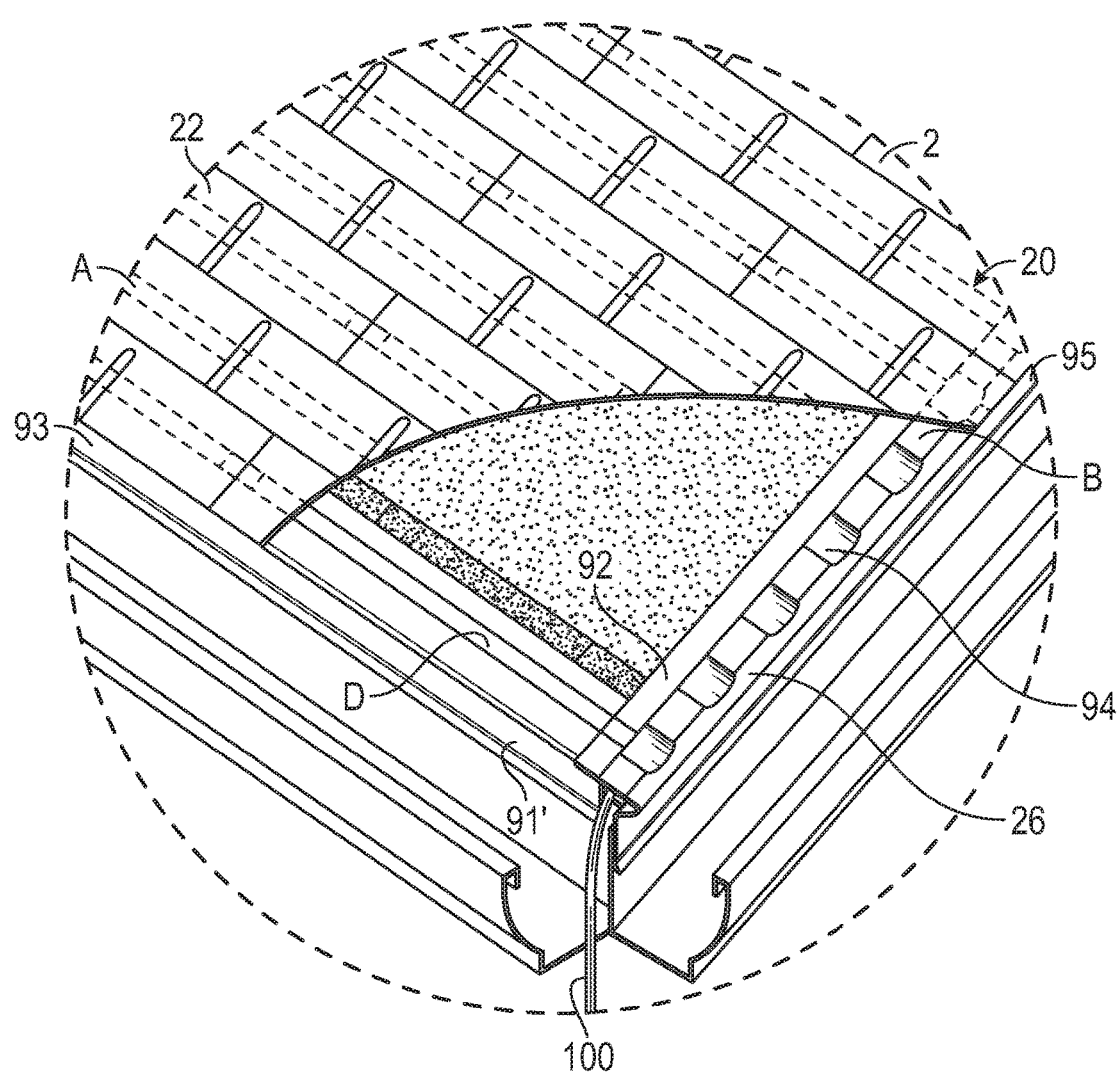
FIG. 11 is a magnified corner portion of FIG. 1 with portions of the shingle system cut away and a first and second drip edge according to various aspects of the present disclosure.

In a third configuration (or "series parallel configuration"), both sides 95 have conductive pathways B, C, and the bottom edge 93 of the roof 2 also has a conductive pathway D (FIG. 11). In this configuration, a further resistive path D on the drip edge 91' creates a shunt resistance, forcing each pathway to have an equal voltage or current traveling through them. This may become necessary in, for example, a desert climate, where high heat is present nearly all year long and the energy output may overload the pathways A, B, C, especially if uneven heat is the cause. Another example includes tropical climates; too many vibrations could potentially overload the circuit, but the shunt resistance at the bottom edge 93 may assist in avoiding these situations.

As depicted in the drawings, a lower electrode 100, such as insulated wire, is connected to the terminal of a collection mechanism 28, such as a battery. The collection mechanism 28 may also be connected to an upper electrode 102 by means of a second electrical connection, such as insulated wire. It is understood that the collection mechanism 28 of the system 20 may, in the alternative, comprise a conventional electrical inverter system or a mechanism for transferring the generated electricity back to the electrical grid.

With reference to FIG. 12, a method 200 of installing the system is described. In step 201, a typical roof 2 is attached to a structure 1, with the roof having at least one of: a support structure 5, a sheathing layer 7, an underlayment layer 9, and undercourse shingle layer 10 (FIG. 1). Installed above the undercourse layer 10 and underlayment layer 9 is a novel shingle system 20. The shingle system 20 has at least one shingle 22, a shingle clip 24, a drip edge 26, and a power unit 28. Each of these components is installed in the following manner.

In step 203, a drip edge 26 having conductive bumps and at least one of an insulative component and an insulative layer is installed on at least one of the roof sides 95 and the roof bottom 93.

In step 205, a shingle 22 having a semiconductive transducer pathway A is installed on at least one of the undercourse layer 10 and the underlayment layer 9.

In step 207, a shingle clip 24 is installed on the shingle 22 to continue the semiconductive transducer pathway A. The shingle clip 24 may be installed within an aperture 25 of the shingle 22 or may be installed over the semiconductive pathway A if the semiconductive pathway is situated on at least one of a top and bottom surface 23, 24 of the shingle 22.

In step 209, a second shingle 22 having a semiconductive pathway A is installed on at least one of the undercourse layer 10 and underlayment layer 9. The second shingle 22 engages the drip edge 26.

In step 211, at least one electrical lead is connected to the drip edge 26 at one end and to an energy collector at the second end.

In step 213, the semiconductive transducer layer transforms energy that is then stored or harvested in the energy collector.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. Further, it will be understood that certain features and subcombinations may be of utility and may be employed within the scope of the disclosure. Further, various steps set forth herein may be carried out in orders that differ from those set forth herein without departing from the scope of the present methods. This description shall not be restricted to the above embodiments. It is to be understood that while certain forms of the present invention have been illustrated and described herein, it is not to be limited to the specific forms or arrangement of parts described and shown.

The invention claimed is:

1. A shingle system, comprising:
   a shingle clip being a cube and having:
      a first aperture defining a C-shape further defined as a first aperture top surface, a first aperture bottom surface, and a first aperture end surface, the first aperture being located on a first width face of the cube and separating the first width face into first upper and first lower side surfaces; and
      a second aperture defining a C-shape further defined as a second aperture top surface, a second aperture bottom surface, and a second aperture end surface, the second aperture being located on a second width face of the cube, the second width face being on an opposed end of the first width face of the cube, the first and second apertures being sized and shaped such that a shingle side may be positioned within;
      wherein the distance between the first and second aperture end surfaces is smaller than a height of the cube;
   a roof shingle having:
      a base layer having an elongate rectangular shape in a longitudinal direction for a roof shingle length;
      an asphalt layer situated upon the base layer;
      a surface granule layer situated upon a top surface of the asphalt layer; and
      a semiconductive layer being an elongate strip in the longitudinal direction across the roof shingle length and situated near a center of the roof shingle, the semiconductive layer being a transducer;
      wherein the semiconductive layer is at least one item selected from the group consisting of the following transducers: a thermoelectric generator, a vibrational generator, and a photovoltaic generator.

2. The shingle system of claim 1, wherein the roof shingle is at least one of a three tab configuration or a dimensional configuration.

3. The shingle system of claim 1, wherein the semiconductive layer of the roof shingle is located at least one of: between the base layer and the asphalt layer, on a bottom surface, and on a top surface.

4. The shingle system of claim 1, further comprising a power collecting unit engaging the semiconductive layer of the roof shingle.

5. The shingle system of claim 1, wherein the semiconductive layer is configured as at least one item selected from the group consisting of: tape, adhesive, paint, and a row of wafers.

6. The shingle system of claim 1, wherein each of the transducers is an adhesive with a plurality of three-dimensional nano structures.

7. The shingle system of claim 1, wherein the roof shingle further includes a sealant layer.

8. The shingle system of claim 7, wherein the sealant layer is unitary with the semiconductive layer.

9. A shingle system, comprising:
   a shingle clip being a cube and having:
      a first aperture defining a C-shape further defined as a first aperture top surface, a first aperture bottom surface, and a first aperture end surface, the first aperture being located on a first width face of the cube and separating the first width face into first upper and first lower side surfaces; and
      a second aperture defining a C-shape further defined as a second aperture top surface, a second aperture bottom surface, and a second aperture end surface, the second aperture being located on a second width face of the cube, the second width face being on an opposed end of the first width face of the cube, the first and second apertures being sized and shaped such that a shingle side may be positioned within;
      wherein the distance between the first and second aperture end surfaces is smaller than a height of the cube;
   a roof shingle having:
      a base layer having an elongate rectangular shape in a longitudinal direction for a roof shingle length;
      an asphalt layer situated upon the base layer;
      a surface granule layer situated upon a top surface of the asphalt layer; and
      a semiconductive layer being an elongate strip in the longitudinal direction across the roof shingle length and situated near a center of the roof shingle, the semiconductive layer being a transducer;
      wherein the semiconductive layer is constructed to be a diode to direct current flow in one direction.

10. The shingle system of claim 9, wherein the roof shingle further includes a sealant layer.

11. The shingle system of claim 10, wherein the sealant layer is unitary with the semiconductive layer.

12. A shingle system, comprising:
   a shingle clip being a cube and having:
      a first aperture defining a C-shape further defined as a first aperture top surface, a first aperture bottom surface, and a first aperture end surface, the first aperture being located on a first width face of the cube and separating the first width face into first upper and first lower side surfaces; and
      a second aperture defining a C-shape further defined as a second aperture top surface, a second aperture bottom surface, and a second aperture end surface, the second aperture being located on a second width face of the cube, the second width face being on an opposed end of the first width face of the cube, the first and second apertures being sized and shaped such that a shingle side may be positioned within;
      wherein the distance between the first and second aperture end surfaces is smaller than a height of the cube;
   a roof shingle having:
      a base layer having an elongate rectangular shape in a longitudinal direction for a roof shingle length;
      an asphalt layer situated upon the base layer;
      a surface granule layer situated upon a top surface of the asphalt layer; and
      a semiconductive layer being an elongate strip in the longitudinal direction across the roof shingle length and situated near a center of the roof shingle, the semiconductive layer being a transducer;
      wherein the shingle clip engages the semiconductive layer, such that a semiconductive pathway is formed.

13. The shingle system of claim 12, wherein the roof shingle further includes an opening in the asphalt layer, such that the shingle clip may directly engage the semiconductive pathway.

14. The shingle system of claim 13, further comprising a first drip edge, the first drip edge being perpendicular with the semiconductive pathway, the first drip edge having an insulated portion and a conductive portion, at least the conductive portion engaging the semiconductive pathway.

15. The shingle system of claim 14, further comprising a second drip edge, the second drip edge being in parallel with the semiconductive pathway, the second drip edge engaging the first drip edge.

16. The shingle system of claim 15, wherein the first drip edge has ridges.

17. A shingle system, comprising:
- a shingle clip being a cube and having:
  - a first aperture defining a C-shape further defined as a first aperture top surface, a first aperture bottom surface, and a first aperture end surface, the first aperture being located on a first width face of the cube and separating the first width face into first upper and first lower side surfaces; and
  - a second aperture defining a C-shape further defined as a second aperture top surface, a second aperture bottom surface, and a second aperture end surface, the second aperture being located on a second width face of the cube, the second width face being on an opposed end of the first width face of the cube, the first and second apertures being sized and shaped such that a shingle side may be positioned within;
  - wherein the distance between the first and second aperture end surfaces is smaller than a height of the cube;
- a roof shingle having:
  - a base layer having an elongate rectangular shape in a longitudinal direction for a roof shingle length;
  - an asphalt layer situated upon the base layer;
  - a surface granule layer situated upon a top surface of the asphalt layer; and
  - a semiconductive layer being an elongate strip in the longitudinal direction across the roof shingle length and situated near a center of the roof shingle, the semiconductive layer being a transducer; and
- a convection layer positioned as a layer within the roof shingle or underneath the roof shingle.

* * * * *